Dec. 21, 1926.
C. E. CAMPBELL
1,611,631
MACHINE FOR PASTING STORAGE BATTERY GRIDS
Filed July 18, 1925
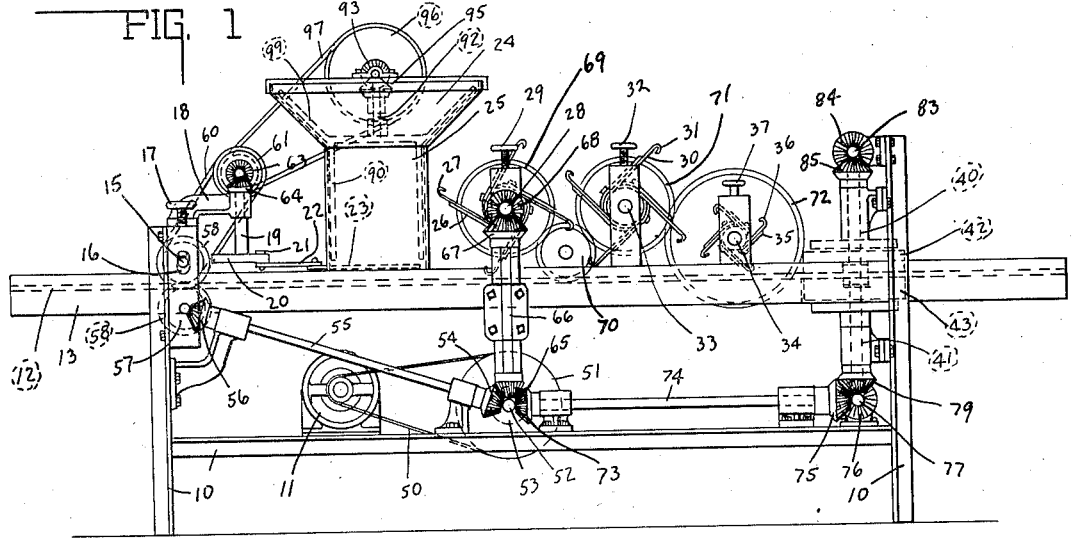
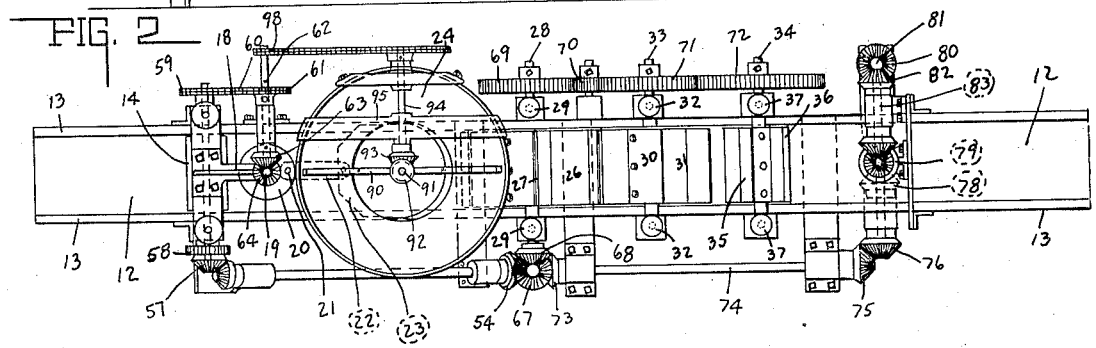
INVENTOR.
CHARLES E. CAMPBELL.
BY
ATTORNEYS.

Patented Dec. 21, 1926.

1,611,631

UNITED STATES PATENT OFFICE.

CHARLES E. CAMPBELL, OF INDIANAPOLIS, INDIANA, ASSIGNOR, BY DIRECT AND MESNE ASSIGNMENTS, OF ONE-THIRD TO WALTER A. WISCHMEYER, OF INDIANAPOLIS, INDIANA, ONE-SIXTH TO DON SPUGNARDI, AND ONE-SIXTH TO EDWARD WISCHMEYER.

MACHINE FOR PASTING STORAGE-BATTERY GRIDS.

Application filed July 18, 1925. Serial No. 44,510.

This invention relates to a machine for automatically applying active material to secondary battery plates.

The chief object of this invention is to automatically paste or fill with paste (chiefly lead oxide) secondary battery plates commonly used in the art.

The chief feature of the invention consists in the provision of a machine which automatically accomplishes the foregoing object and in accomplishing the same uniformly distributes the paste material to the several portions of each plate, and in addition thereto finishes the same therein by smoothing and finally polishes the plate to remove such surplus paste or active material from the plate leaving a clean plate.

Another feature of the invention is that the machine is capable of operating upon plates of different depths but having the same widths. By a slight re-arrangement it is likewise capable of operating upon plates of variable widths.

A further feature of the invention consists in the agitation of the material to be pasted by means of a scraper associated with the paste container and driven in timed relation with the remaining mechanism.

The full nature of the invention will be understood from the accompanying drawings and the following description and claims:

In the drawings Fig. 1 is a side elevational view of the invention. Fig. 2 is a top plan view thereof.

In the drawings 10 indicates a framework mounting a motor 11 supplying power to the machine. Also mounted upon the framework is a table 12. This table is of trough formation having the sides 13 as shown clearly in Fig. 2. On the forward end of the trough or table there is positioned a pair of oppositely rotating rolls 14 in superposed relation. The lower roll is positioned at or near the level of the table 12 and the uppermost roll is mounted for relative movement in relation thereto by means of the shaft 15 slidably supported in the slot 16. An adjustable member 17 may or may not be associated with yielding means, but is associated with the shaft 15. Thus, battery plates are adapted to be passed along the table 12 between the two rollers and be carried forwardly by said rollers.

Upon an over-hanging arm 18 there is supported a shaft 19 which includes a crank in the form of a disc 20 having a crank pin 21 eccentrically mounted thereon and if desired, adjustably mounted, that is, having reference to the center of rotation. A link 22 is pivotally connected to a gate or cut-off plate 23. By shifting the position of pin 21 the amount of opening uncovered by the gate in its reciprocation will be varied.

Positioned above the table 12 is a hopper 24 having a supply mouth 25 which is adapted to receive and discharge paste or active material on to the plates as they are presented successively beneath said hopper and mouth or funnel and upon said table 12, each plate being constantly passed beneath the same and on the table by means of the rollers 14 forcing additional plates along the table.

The plate with the active material thereupon passes beneath a smearing roll which is herein shown in the form of a plurality of angularly projecting resilient blades or paddles 26, having the curved free ends 27. These are mounted upon shaft 28 and are rotatable therewith. The position of shaft 28 with respect to the plane of the table may be adjusted by suitable means such as indicated at 29, and if desired yielding means may be associated therewith for securing a predetermined pressure upon the plates. This smearing roll as each blade 26 engages the plate smears the active material into the interstices of the plate and distributes the active material throughout the plate. The plate after passing through the first smearing roller is engaged by a second smearing roller having the blades 30, and similarly adjustably mounted as at 32. The paddles 30 and 26 rotate in the same direction and are herein shown having a common path, they being so arranged that a paddle of each roll alternately passes through said path. The rotation of both rolls is in the same direction and is at a speed greater than the travel of the plates through the machine. Any number of smearing rolls may be provided and if desired the particular type of smearing roll herein described, that is, of the paddle or blade type, may be omitted and a roller substituted therefor, although best results have been obtained with the particular type of roll previously described.

Behind the two smearing rolls mentioned there is similarly supported another roll having the shaft 34 and with similar blades 35 having the similar ends 36, and similarly mounted as indicated at 37. This roller, however, is a smoothing roller and rotates in the opposite direction from the rotation of the smearing rolls and with the same angular velocity.

Behind the smoothing roll is a smoothing and polishing device, which consists of a pair of axially aligned shafts 40 and 41 which terminate adjacent the table and in smoothing and polishing plates 42 and 43. These two plates rotate at high speed and polish a plate by removing all of the surplus paste from the plates and forming a clean and filled or pasted plate. Each plate has relatively yielding movement axially of the other and preferably both plates are so yieldingly mounted. These plates also rotate in opposite directions.

The power connections are as follows: Motor 11 through suitable means 50 drives main gear, sprocket or pulley 51. The shaft 52 carries a driving bevelled gear 53 which drives bevel gear 54 on shaft 55. The latter terminates in a bevel gear 56 driving bevel gear 57 upon a relatively permanently mounted shaft 15. The lower shaft 15 carries meshing gear 58 and the upper shaft 15 carries a sprocket wheel 59, which by means of sprocket chain 60 drives a sprocket wheel 61 carried by shaft 62. Shaft 62 terminates in a bevel gear 63 which drives a bevel gear 64 on shaft 19 previously described.

Bevel gear 53 also drives a bevel gear 65 carried by shaft 66. This shaft terminates in a bevel gear 67 which drives a bevel gear 68 mounted on shaft 28. Shaft 28 at one end carries a gear 69, with which there meshes another and idler gear 70, in turn meshing with the gear 71 upon shaft 33 for driving the two smearing rolls in the same direction. Meshing with gear 71 is a gear 72 carried by shaft 34 and this gear connection secures reverse rotation of the smoothing roll.

A bevel gear 73 carried upon shaft 74 meshes with the bevel gear 53 and terminates at its opposite end in a bevel gear 75. Bevel gear 75 meshes with a bevel gear 76 upon shaft 77. This shaft terminantes in a bevel gear 78 which meshes with bevel gear 79 carried by shaft 41. The shaft 77 extends across and beneath the table and upon its opposite end carries a bevel gear meshing with another bevel gear 80 mounted on a vertical shaft 81 which terminates in a bevel gear 82 mounted upon shaft 83. This shaft 80 terminates in a bevel gear 81 meshing with a bevel gear 82 mounted on shaft 83 and shaft 83 carries bevel gear 84 meshing with the bevel gear 85 carried by shaft 40 previously described.

The operation of the device will be briefly described as follows:

The plates are presented to the feeding rolls 14 and are caused to move through the machine by succeeding plates being forced along the table. As the plates pass beneath the hopper the active material is forced on to the plates and into the same and the amount thereof is gaged or determined by the cut-off plate. The plates with the material then pass to the first smearing roll where the material is smeared or pasted into the interstices of the plate and said material is distributed throughout the plate. The foregoing is continued as the plate passes under the second smearing roll. The reversely rotating smoothing roll then engages the plate and smooths the material in the interstice and levels the same following which the plate is passed between the polishing plates or wheels which not only polish the material and seat all of it in the plate, but also polish the plate and remove the surplus material therefrom.

Within the hopper 24 is an inverted U-shaped scraper 90. This scraper 90 is rotatably supported within the body of the hopper upon a shaft 91 carrying a bevel gear 92 which meshes with another bevel gear 93 secured to shaft 94 rotatably supported in a bracket 95. The shaft 94 passes above the hopper and terminates in a sprocket wheel 96 with which is associated a sprocket wheel 97 meshing with the sprocket wheel 98 mounted on an extension of the shaft carrying the sprocket wheel 61. The U-shaped scraper 90 is provided with two outward and upward extensions 99. These clear the flared portion of the hopper while the lower arms of the scraper clear the body of the hopper and prevents caking of the material. This scraper also keeps the material somewhat agitated and therefore prevents its setting which it has a tendency to do.

The invention claimed is:

In a battery pasting machine, the combination of means for supporting battery plates in tandem relation, roller means having directional movement opposite to that of the plate movement and for successively engaging the plates, other and parallel roller means similarly engaging said plates and having the same directional movement with said plates in their passage, and rotary material actuating means mounted on an axis transverse to the roller axis and having a face for engaging the plates in their passage through the machine.

In witness whereof, I have hereunto affixed my signature.

CHARLES E. CAMPBELL.